J. B. HARSHMAN.
DIRECTION INDICATOR.
APPLICATION FILED SEPT. 27, 1918.
1,303,476.
Patented May 13, 1919.
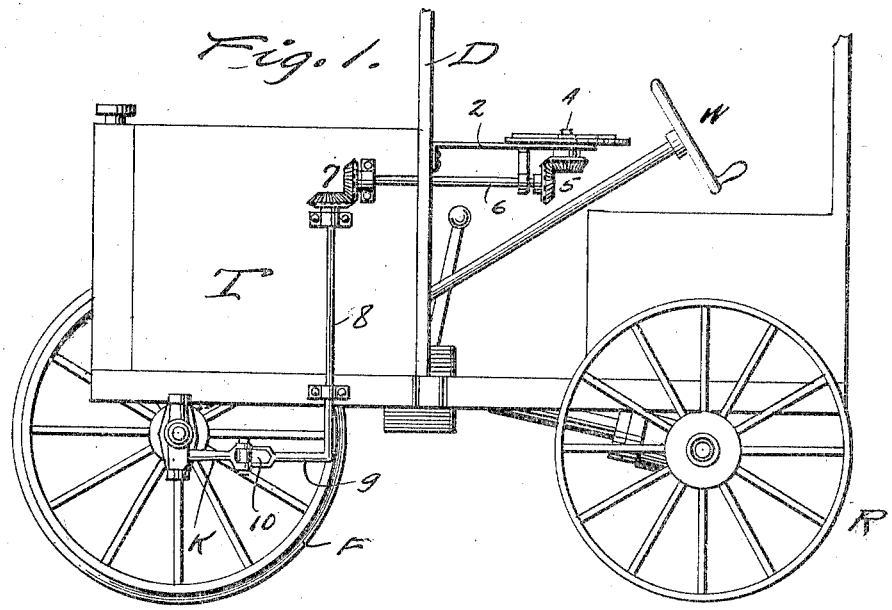
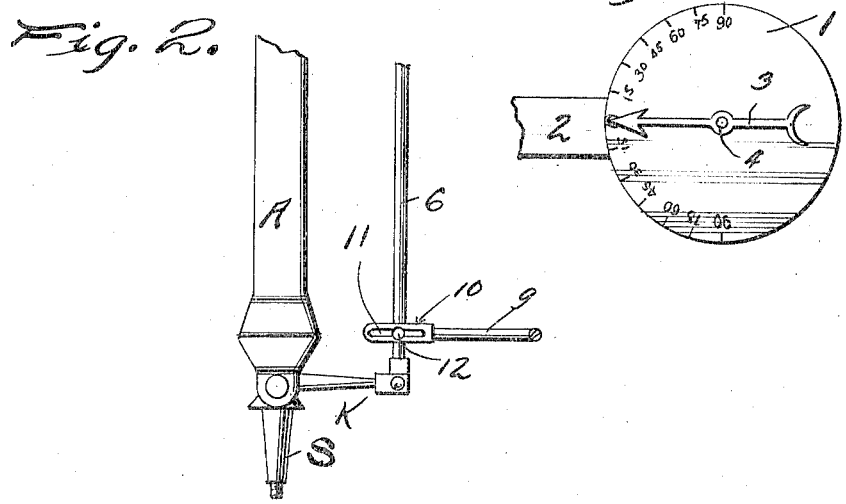
WITNESSES
Inventor
Jennings B. Harshman
By Richard Ellwon,
Attorney

UNITED STATES PATENT OFFICE.

JENNINGS B. HARSHMAN, OF DAVENPORT, IOWA.

DIRECTION-INDICATOR.

1,303,476. Specification of Letters Patent. Patented May 13, 1919.

Application filed September 27, 1918. Serial No. 255,927.

*To all whom it may concern:*

Be it known that I, JENNINGS B. HARSHMAN, a citizen of the United States, residing at Davenport, in the county of Scott and State of Iowa, have invented certain new and useful Improvements in Direction-Indicators, of which the following is a specification.

This invention is an attachment applicable to a motor vehicle such as a tractor for indicating to the driver when the steering wheels are so set that the machine is traveling in a straight line, or if deflected from such line, to what extent. In other words, the invention is a direction indicator. The present practice in driving across a field a tractor which is dragging a plow or other agricultural machine, is for the driver to pick out a point on the far side of the field and steer straight toward it; otherwise mechanical means are desirable to prevent the tractor from getting out of a straight line. The purpose of the present invention is to provide an indicator or register directly under the eye of the driver so that he may be continuously informed of the course being followed by the tractor.

Details are set forth in the following specification and claim and reference is made to the drawings, wherein:—

Figure 1 is a side elevation of a portion of a tractor equipped with its attachment.

Fig. 2 is a detail in plan showing how the attachment is actuated by the connecting rod between the knuckles.

Fig. 3 is a plan view of the dial.

In the drawings, the letter T designates broadly a motor vehicle such as a tractor whereof we are concerned only with the front and rear wheels F and R, the steering wheel W, the dash D, the front axle A with its spindle S and knuckle K and the connecting rod C which leads from one knuckle to the other. I have not thought it necessary to illustrate the connection between the steering shaft of the wheel W and the connecting rod C. All parts thus far described are well known. The nearer front wheel F is omitted in Fig. 1 for sake of clearness.

The numeral 1 designates a dial carried by an arm or bracket 2 secured to the dash D, and the face of the dial is inscribed with graduations from zero at its forward side to ninety degrees on either side thereof as seen in Fig. 3. Over the dial moves a pointer or index 3 mounted on a shaft 4 which, as seen in Fig. 1, is geared as at 5 to a horizontal shaft 6 which leads forward and is in turn geared at 7 to an upright shaft 8 which extends down below the framework. At its lower end this shaft is bent forward in an arm 9 forked as at 10, and the fork arms are slotted as seen at 11 in Fig. 2 so as to engage a pin 12 fixed through the connecting rod C.

When now this rod is moved in either direction by turning the steering wheel W, the crank arm 9 is swung to one side or the other and the oscillation of the shaft 8 is communicated through the series of gears to the shaft 4 and the index 3. When the machine is proceeding straight ahead as shown in the drawings, the tip of the index stands over the point zero on the dial. The graduations may indicate degrees of a circle, and therefore the position of the index will immediately show the driver to what extent the steering wheels are diverted from their normal longitudinal position.

With this attachment applied to the dash D of a tractor T, the driver could see at once the direction of travel. Having set his machine to pass straight across the field being plowed, for instance, he has but to hold the steering mechanism so that the point of the index will remain over the zero on the dial, no matter how rough the surface of the earth. Or if he should release his hold on the steering wheel W, or if vibration should turn the front wheels F aside, the attachment is useful to enable him to ascertain when he has restored his steering wheels accurately to their proper point.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claim.

Having thus fully described my invention, what I claim as new and desire to secure by Letters Patent, is:—

A direction indicator for tractors comprising a dial inscribed with graduations, an index moving over the same and mounted on a shaft, a rock shaft having a crank arm forked at its end and passing astride the connecting rod between the knuckles on the steering axle, the fork arms being slotted, a pin through said rod engaging said slots, a horizontal shaft, gearing connecting one end thereof with said rock shaft, and gearing connecting its other end with the index shaft.

In testimony whereof I affix my signature in presence of two witnesses.

JENNINGS B. HARSHMAN.

Witnesses:
   SUMNER E. LACEY,
   H. W. SANFORD.